Jan. 16, 1962  A. ILLOWSEK  3,017,192
EXPANDABLE CHUCKS
Filed June 23, 1960
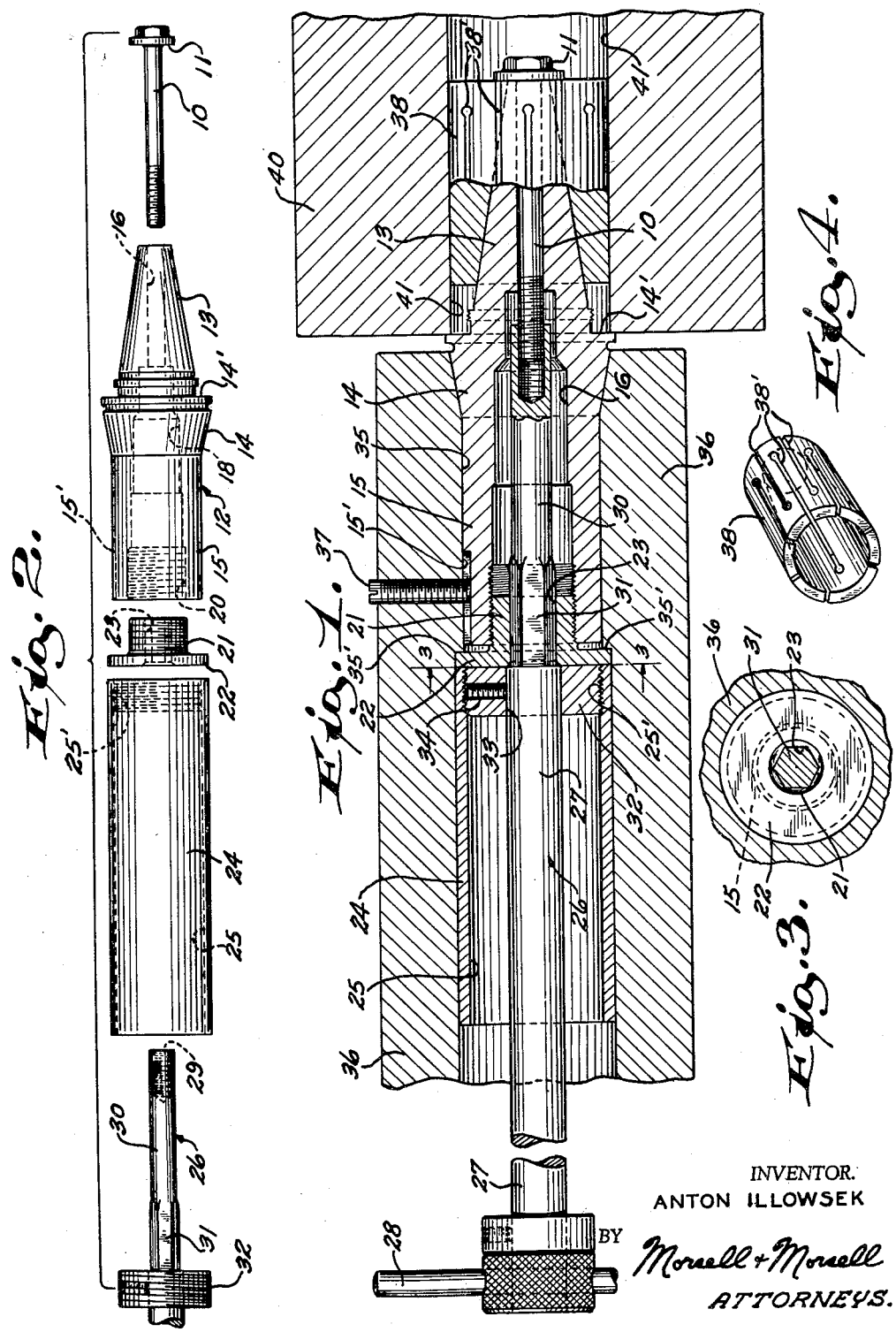
INVENTOR.
ANTON ILLOWSEK
BY Morell + Morell
ATTORNEYS.

United States Patent Office

3,017,192
EXPANDABLE CHUCKS
Anton Illowsek, 11124 Church St., Hales Corners, Wis.
Filed June 23, 1960, Ser. No. 38,259
2 Claims. (Cl. 279—2)

This invention relates to improvements in expandable chucks, and more particularly to a new chuck having an improved, integral locking device therein.

Generally, work holding devices of the type hereinafter described, which are designed to engage within the internal bore of a workpiece to permit machining operations on the exterior surface thereof, includes an expandable gripping member and means for expanding said member after a workpiece has been mounted thereon. Such internal chucks, or collets as they are sometimes called, should be accurately designed, of course, so that the work can be precisely aligned with the cutting tool, and in addition the chuck should be so designed that it will remain in position relative to the tool while it is being expanded to engage the workpiece. Unfortunately, the latter feature is not present in conventional chucks since the entire chuck assemblage must be moved longitudinally in the machine spindle to permit expansion or contraction of the gripping member, and the accurate mounting of the workpiece is a matter of guess work and trial and error. Moreover, with such conventional chucks it is difficult to mount successive workpieces in exactly the same position relative to the tool, which is important when machining identical or interfitting parts. With this in mind, the principal object of the present invention is to provide a novel chuck assemblage which can be locked in position within the machine spindle, and wherein work can be mounted on or disengaged from the chuck without disturbing the position of the same relative to the tool.

A further object of the invention is to provide a workholding device for machine tools as described, wherein the stationary character of the chuck body within the machine spindle eliminates the possibility of metal chips or dirt finding their way into the spindle opening and damaging the mechanism or causing the work to turn unevenly.

A further object is to provide a workpiece holder or chuck which is adapted for use with workpieces of different sizes and bores, and which holder can be easily adapted for machines of varying sizes or types without using special machine nose adapters, as is necessary with conventional chucks.

A further object is to provide a chuck device as described wherein the gripping member is designed to expand uniformly throughout its entire length, thereby providing sure and even engagement of the workpiece and minimizing the possibility of the work inadvertently shifting during the machining operation.

A further object is to provide a chuck assemblage for lathes, drill presses, milling machines, and other machine tools, which chuck can be quickly and easily mounted on or detached from the machine and which can be used interchangeably on most conventional machine tools.

Still further objects of the invention are to provide a workholding device as described, which is simple and reliable in operation, which is economical in construction, and which is rugged and durable in use.

With the above and other objects in view, the invention consists of the improved expandable chuck, and integral locking mechanism, and all of its parts and combinations, as set forth in the claims, and all equivalents thereof.

In the accompanying drawing, illustrating the preferred form of the invention, and wherein like reference characters indicate the same parts in all of the views:

FIG. 1 is a longitudinal vertical sectional view of the improved chuck in position in a machine tool spindle, and with a workpiece mounted thereon;

FIG. 2 is an exploded, side elevational view of the complete chuck assemblage;

FIG. 3 is a transverse sectional view of the chuck taken along the line 3—3 of FIG. 1; and FIG. 4 is a perspective view of the expandable gripping member utilized in the invention.

Referring now more particularly to FIGS. 1 and 2 of the drawing, it will be seen that the improved chuck assemblage includes, generally, an actuating pin 10, the inner end of which is threaded and the outer end of which is in the form of an enlarged head 11, an expandable gripping member or bushing 38 (FIG. 1), a collet body 12, a screw locking member 21, a drawbar sleeve 24, and a combination draw rod and locking wrench 26, the design and function of which coacting members will now be described in greater detail.

As is best shown in FIG. 2, the collet body 12 employed in the present invention includes a conical nose portion 13, which is tapered toward its forward or outer end, and a central portion 14 which is flared outwardly toward its forward end and which provides a shoulder or workpiece stop 14' at the inner end of said nose 13. The rearward portion 15 of said collet body is cylindrical in form and has a longitudinal groove 15' in its upper surface. The entire body member has a passageway 16 running longitudinally therethrough, and as will be seen in said FIG. 2, said passageway consists of a relatively small diameter bore in the forward or nose portion of said body member which communicates with progressively larger bores toward the rear or inner end of said member, terminating in a relatively large, threaded bore 20.

The screw locking member 21 is designed to be releasably received in said threaded collet body bore 20, and includes a forwardly projecting threaded shank and an enlarged circular head 22 of slightly larger diameter than the diameter of the cylindrical rear portion 15 of the collet body 12. Extending longitudinally through said screw member 21 is a bore 23 which is hexagonal in form, the design of which bore plays an important part in the assembly of the unit, as will be hereinafter seen.

The drawbar sleeve 24 has an enlarged bore 25 therethrough, the forward end of which bore is threaded as at 25' and is designed to be slidably inserted into the machine spindle 36 (FIG. 1) when the unit is in its assembled condition.

The aforementioned combination draw rod and locking wrench 26 includes an elongated cylindrical shaft 27, the extreme rear end of which may have a turnbar 28 or other conventional turning device mounted thereon, and the forward end of said rod has an internal threaded bore 29 (FIG. 2) extending rearwardly therefrom which is adapted to receive the inner end of the actuating pin 10, as will be seen. The forward end of said rod 26 is cylindrical in form, being of a lesser diameter than the elongated shaft portion 27 thereof, while the intermediate portion of said rod is hexagonal in cross sectional form to fit within the hexagonal bore 23 in the screw member 21 (FIG. 3). Mounted on said rod 26 adjacent the hexagonal section 31 thereof, is an externally threaded guide collar 32 adapted to screw into the end bore 25' of the drawbar sleeve to secure said members together. Said collar has an internal bore 33 therethrough to receive the shaft portion 27 of said rod, and in the preferred form of the invention said collar is maintained in rigid position on the shaft by means of a set screw 34 bearing thereagainst.

As shown in FIG. 1, the headstock spindle 36 in which the present chuck is adapted to be mounted includes a longitudinal central bore 35 extending completely therethrough, which bore is flared outwardly at its forward end and which bore is enlarged intermediate its length to provide a rearwardly facing circumferential shoulder 35' in the spindle interior as shown in FIG. 1. A set screw 37 projects into said spindle bore a short distance. It is to be understood, of course, that the design of the headstock spindle is not claimed per se as a part of the present invention, inasmuch as said spindle is a component part of a conventional machine tool, but has been illustrated and described herein merely to permit a better understanding of the assembly and operation of the improved chuck comprising the present invention.

In the assembly of the chuck, the collet body 12 is inserted into the forward end of the spindle bore 35, with the groove 15' in said body aligned with the aforementioned set screw 37. As will be seen in FIG. 1, said set screw projects into said groove 15' when the collet has been fully inserted therein, thereby preventing the collet from turning within the spindle mounting. The screw stop member 21 is then inserted in the opposite or rear end of the spindle, as distinguished from conventional chucks wherein the entire unit is inserted from the spindle forward end, followed by the drawbar sleeve 24 and rod 26, the collar 32 on the latter member being threaded into the sleeve bore portion 25' to join said sleeve and rod members. The forward end of the rod 26 is then urged through the screw member 21 and into the collet body until the hexagonal portion 31 of said rod engages within the hexagonal opening 23 in said screw member.

In addition to its use as the means for moving the actuating pin 10 into and out of engagement with the expandable gripping member, as will be described, the rod 26 also functions as a wrench for the screw stop member 21 and when said rod is turned the threaded shank portion of said member 21 is screwed into the threaded inner end 20 of the collet body bore. In practice, said screw member 21 is urged into the collet body until the enlarged head portion 22 thereof abuts the aforementioned circumferential shoulder 35' within the spindle bore. As will be readily appreciated, when the screw member is in this condition the collet body is locked in position within the machine spindle, the screw stop abutting the spindle interior shoulder 35' and preventing forward movement, and the flared forward end portion of the collet wedgingly engaging within the spindle front opening and preventing rearward movement. The purpose of this feature is to prevent axial shifting of the collet body within the spindle while a workpiece is being mounted thereon or removed.

After the collet body has been locked in position within the machine spindle, as described, an expandable bushing 38 is mounted on the conical nose portion 13 of said body. As will be seen in FIG. 4, said bushing 38 has a tapered bore therein designed to match the taper of the collet nose portion 13, and has a plurality of spaced longitudinal slits 38' which extend inwardly from opposite ends of the bushing in an alternate manner. It has been found that this form of bushing expands evenly along its entire surface, permitting an unusually firm grip on the workpiece, and is preferred for this reason. Finally, the pin 10 is inserted into the forward end of the collet until it engages within the threaded opening 29 in the end of the combination draw rod and locking wrench 26. Rearward movement of the drawbar sleeve, and attached rod, will then draw the actuating pin 10 inwardly and the enlarged head portion 11 thereof will urge the expandable bushing 38 upwardly on the collet nose 13.

As will be seen in FIG. 1, a piece of work 40 may be mounted on the bushing 38 prior to its expansion, and as the draw rod 26 is moved rearwardly, thereby urging the actuating pin 10 inwardly as described, the upward movement of the expandable bushing on the cone 13 causes said bushing to expand and to engage within the bore 41 of the workpiece to hold the same in position for the machining operation.

To release and remove the workpiece, after it has been machined, it is merely necessary to push the drawbar and rod assemblage forwardly, thereby pushing the actuating pin forwardly and out of the collet body. As said pin moves, the expandable bushing 38 rides downwardly on the collet nose, releasing its grip on the workpiece, and the piece may be easily removed and a new workpiece mounted thereon. The result is a novel mechanism whereby a piece of work may be mounted on the spindle by merely moving the actuating pin, through the drawbar, and without moving the collet body 12 axially of said spindle.

The advantage of the construction hereinabove described is that by eliminating any lingitudinal movement of the collet member relative to the spindle, the workpiece remains in its predetermined position while the gripping member is being expanded, thereby avoiding the guesswork and trial and error characterizing conventional internal chucks. In addition, successive workpieces may be mounted exactly the same position relative to the tool, which is important when machining identical or interfitting pieces. Moreover, and extremely important in machining operations wherein great precision is required, by eliminating any movement of said collet member, the possibility of chips or dirt entering the spindle bore and causing misalignment of the collet therein, and consequent out-of-round of the workpiece, is avoided. The mechanism is also unusually simple and efficient in operation, and can be eeasily adapted for use in machine tools having larger spindle bores by the addition of a conventional collet adapter unit.

It is to be understood, of course, that the improved expandable workpiece holder comprising the present invention is not to be limited or confined to the exact structural details illustrated and described herein. Obvious modifications in the individual components will undoubtedly suggest themselves to persons skilled in the art, and all of such changes or modifications are contemplated which do not depart from the spirit of the invention and which may come within the scope of the following claims.

What I claim is:

1. In combination with a machine tool having a spindle bore with an internal, rearwardly facing annular shoulder, said bore being flared outwardly at its forward end, a workholding chuck comprising: a collet body removably mounted in said spindle bore, said collet body having a nose portion projecting forwardly from said bore, having a flared central portion wedgingly fitted within said spindle bore flared forward end, and thereby preventing rearward longitudinal movement of said body within the bore, and said collet body having a cylindrical rearward portion projecting into said spindle bore and terminating forwardly of said bore annular shoulder, there being an axial bore through said collet body; a stop member having an enlarged head and having a forward shank portion removably inserted into the rear end of said collet body to a point where said enlarged head portion abuts said spindle internal shoulder and prevents forward longitudinal movement of the collet body within the spindle bore, said stop member having a bore therethrough in registration with said collet body bore; means for releasably locking said stop member in said inserted position; an expandable work-holding bushing on the forward nose portion of said collet body; and draw means longitudinally-movably carried in said registering collet body and stop member bores for expanding and contracting said bushing.

2. In combination with a machine tool having a spindle bore with an internal, rearwardly facing annular shoulder, said bore being flared outwardly at its forward end, a work-holding chuck comprising: a collet body removably mounted in said spindle bore, said collet body having a nose portion projecting forwardly from said bore, having a flared central portion wedgingly fitted within said spindle bore flared forward end, and thereby preventing rearward longitudinal movement of said body within the bore, and said collet body having a cylindrical rearward portion projecting into said spindle bore and terminating forwardly of said bore annular shoulder, there being an axial bore through said collet body having a threaded rear end section; a stop member having an enlarged head and having a threaded forward shank portion screwed into the rear end of said collet body to a point where said enlarged head portion abuts said spindle internal shoulder and prevents forward longitudinal movement of the collet body within said spindle bore, said stop member having a bore therethrough in registration with said collet body bore; an expandable work-holding bushing on the forward nose portion of said collet body; and a draw member longitudinally-movably and rotatably carried in said collet body bore, said draw member having a portion extending through and being slidably but non-rotatably fitted within said stop member bore and being adapted to screw said stop member into and out of said collet body upon rotation of said draw member; and means on the forward end of said draw member adapted to expand and contract said bushing upon longitudinal movement of said draw member.

References Cited in the file of this patent

UNITED STATES PATENTS

| | | |
|---|---|---|
| 2,469,873 | Ernest | May 10, 1949 |
| 2,841,402 | Drew | July 1, 1958 |
| 2,877,022 | Parker | Mar. 10, 1959 |
| 2,896,954 | Ernest | July 28, 1959 |